June 14, 1966  N. R. HIGGINS  3,256,066
APPARATUS FOR PRODUCING CARBON BLACK
Filed March 27, 1963  2 Sheets-Sheet 1

INVENTOR.
NORMAN R. HIGGINS
BY
ATTORNEY

INVENTOR.
NORMAN R. HIGGINS
BY
*William Kammerer*
ATTORNEY

United States Patent Office 3,256,066
Patented June 14, 1966

3,256,066
APPARATUS FOR PRODUCING CARBON BLACK
Norman R. Higgins, Bakersfield, Calif., assignor to Continental Carbon Company, Houston, Tex., a corporation of Delaware
Filed Mar. 27, 1963, Ser. No. 268,382
6 Claims. (Cl. 23—259.5)

This invention relates to the production of rubber grade carbon blacks, especially those characterized in having high abrasion-resistant properties, by the pyrolysis of normally liquid hydrocarbons and more particularly concerns an improved apparatus for effecting the production of such blacks.

Reference is made to application Serial No. 32,688 filed May 31, 1960, now Patent No. 3,087,796, and to application Serial No. 234,032 filed October 30, 1962, wherein furnace modifications are disclosed admirably adapted to produce high quality rubber reinforcing grades of carbon black. The apparatus embodiments disclosed and claimed in the aforementioned applications can be employed to produce rubber grade carbon blacks by either the centrifugal flame method or the longitudinal flame method. These respective methods are well known to those skilled in the art. The apparatus of application Serial No. 32,688 is primarily adapted for producing carbon black utilizing the centrifugal flame process, whereas the furnace modifications taught in Serial No. 234,032 can be adapted to prepare carbon blacks either by the centrifugal flame or longitudinal flame method. The common salient feature of the apparatuses taught in the aforementioned applications is the relative simplicity of construction of their design. The organization of the various parts constituting this type of furnace design is such whereby, in spite of the high temperatures encountered in the operation thereof, any unit on stream can be shut down, cooled and disassembled in but a minute fraction of the time required to similarly service virtually all other prior art carbon black furnaces which are, for the most part, massively lined with refractories and insulating materials.

The improved apparatus of the present invention is composed of various elements and such elements are cooperatively arranged in essentially the same manner as taught for the devices exemplified in the above-mentioned applications. As is known to those skilled in this art, the characteristics of the flame employed to effect dissociation of carbon producing feed stocks in apparatuses of this type is of profound importance. The flame pattern observed, whether it be a centrifugal pattern or a longitudinal flame pattern, critically determines a number of aspects of the overall carbon black forming process. For example, the yield of carbon black, the production rate of product, and above all, the quality of the product are in the main determined by the particular type of environmental conditions, i.e., temperature, turbulency and the like, existing in the reaction zone wherein the carbon producing feed stock is substantially instantaneously dissociated into carbon black.

In the applications referred to hereinabove, the taught furnaces are provided with an element which serves to control the manner of introduction of combustion air to the reaction zone and in so doing is capable of regulating the precise type of flame pattern or cracking conditions which are experienced at the situs where the dissociation of the carbon producing feed stock is initiated. In the earlier filed referred-to application, this element was termed a "grit eliminator" whereas in the later filed application, this element was more properly designated a "combustion aid device." The gist of the instant invention concerns an improved modification of this element, namely, the combustion aid device. Precisely how the improved combustion aid device of the present invention differs from that taught previously can be accomplished best in the detailed disclosure given hereinbelow concerning the various embodiments contemplated herein. It might, however, warrant mentioning here that while the physical difference between the combustion aid device 36 of the present invention and that of the prior art appears to be minor, the effect of such change is marked. The advantages to be obtained in practicing this invention will be brought out in the discussions presented hereinbelow.

The present invention, then, comprises the novel departure from the prior art as generally outlined hereinabove and which now will be fully described with reference to the illustrative embodiments shown in the accompanying drawings in which.

Figure 1:
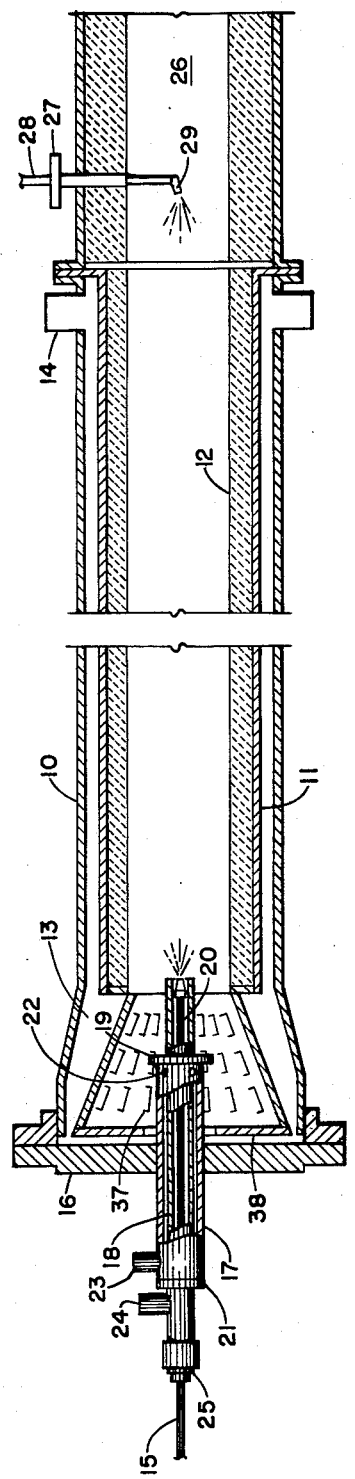
FIGURE 1 is a longitudinal elevation illustrating the general form of a carbon black furnace embodying the teachings of this present invention, in combination with a fuel burner-feed stock injection assembly, said assembly being shown partly cut away for emphasis of construction details.

Referring to the drawings and particularly to FIG. 1 thereof, the numeral 10 designates an elongate metallic housing or shell which comprises the outer jacket of the apparatus of the present invention. Concentrically disposed within housing 10 is an elongate metallic tube or reactor tube 11 of lesser diameter than that of the housing. The metallic tube 11 can be suitably supported within the housing by means of a plurality of spacer rods (not shown) welded onto its outer surface. Elongate tube 11 is provided with a lining of refractory 12, said lining being preferably fabricated from a material having a relatively high heat transfer coefficient. The refractory lining 12 is also desirably of minimum thickness throughout the major portion of elongate tube 11, such thickness being adapted, however, to protect tube 11 under operating conditions for an extended period of time. A suitable nominal thickness of the liner depends principally upon the mechanical strength properties of the refractory used. Thus, a material such as silica carbide, can be utilized in thicknesses ranging from about ½–¼ inch and even less, Other suitable liners can be molded in place, employing conventional castable refractory compositions. For example, castable Kaolin-based refractories can be used in this manner. When employing the castable type of refractory lining, it is generally desirable to employ greater thicknesses thereof than mentioned in connection with the use of a liner of silica carbide. By so doing, one can reinforce the castable type liner with wire mesh and similar reinforcers so as to improve its structural integrity. However, a 2-inch thick liner of a castable refractory of the type specifically mentioned within a 14-inch diameter metallic reactor tube has been successfully employed without reinforcements and at the same time has provided a satisfactory degree of heat transfer capability.

The corresponding downstream ends of the outer housing or shell 10 and elongate tube 11 are arranged in substantially flush alignment. The outer housing 10 can take the form of a standard steel tube and the length thereof should be sufficiently greater than that of the elongate tube 11 so as to project several feet beyond the upstream end of the latter, thereby providing a generally cylindrical chamber 13 substantially unobstructed save for certain appurtenances disposed therein including the improved combustion aid device 36 of the present invention.

As for specific measurements of the elements described directly hereinabove, the outer shell 10 can acceptedly vary between 10 and 15 feet and the length of the reactor tube 11 can suitably be about two to three feet less than the length selected for the shell member. A suitable nominal diameter for the outer shell 10 can be 18 inches with the inner elongate tube 11 being from about 10 to 14 inches in diameter and also of standard steel composition.

In FIG. 1, free oxygen containing gas, as for example atmospheric air, is tangentially introduced into air inlet 14 near the downstream end of housing 10 to be circulated in the annular spacing between said housing and the inner tube 11. The air introduced into the annular spacing flows in the general direction of the upstream extremity of the annular spacing and thereupon a predominant amount of the air enters chambers 13 via the axially disposed combustion aid device 36 and therein turbulently mixes with a fuel gas to provide a flame for dissociating a hydrocarbon feedstock into carbon black as will be explained more fully hereinbelow.

As exemplified in FIG. 1, the improved combustion aid device 36 can take the form of a metallic frusto-cone with its smaller end suitably connected to the adjacent end of reactor 11 and in open communication therewith. The frusto-cone can be fabricated from heat resistant sheet metal such as 22 gauge No. 309 stainless steel. The length of the combustion aid device 36 is such whereby the larger end thereof is spaced inwardly of but in proximity to housing closure member 16. Likewise, the combustion aid device 36 extends at a suitable angle so that the periphery of the larger end thereof is similarly spaced from the corresponding peripheral extremity of generally cylindrical chamber 13. For a unit of the dimensions generally given above, the aforementioned space relationships can be in the order of a couple of inches or so, which positional arrangement permits about 10 percent of the total amount of air introduced to flow into the interior of the frusto-cone contiguous to the inside surface of the closure member 16. This small amount of air serves to keep the closure member 16 and a part of the apparatus such as the housing member adjacent thereto cool.

As indicated above, the outer surface of the combustion aid device 36 is provided with a plurality of louver rows 37 arranged in concentric rings. In FIG. 1, these louvers are shown as being in a plurality of rows and extending outwardly with respect to the surface of the frusto-cone in a scoop-like fashion with respect to the combustion air helically flowing about said cone due to the tangential introduction of the air as described for this embodiment. In the drawing, the area of the louvers are shown for convenience sake to be approximately of the same size. However, it has been found desirable to gradually enlarge the louvered apertures as the rows thereof approach the extremity of the frusto-cone disposed near the closure member 16. The end of the frusto-cone adjacent to the cover member 16 is provided with an enclosure 38. Said enclosure is provided with a central aperture sufficiently large so as to accommodate the fuel gas-hydrocarbon feedstock injection assembly to be described below. This central aperture permits the ingress of the combustion air flowing adjacent to cover member 16 into the interior of the combustion aid device 36. As mentioned, the diameter of said aperture is sufficiently large to permit the insertion of the fuel gas-feedstock injection assembly but the diameter thereof is substantially smaller than the diameter of the smaller end of the frusto-cone.

The fuel burner and hydrocarbon feedstock injection assembly is generally depicted at 15 in FIG. 1 and is shown extending through end wall 16 forming a closure member for the upstream extremity of the housing 10. More specifically, the burner-feed stock injection assembly comprises a tube 17 extending through cover member 16 substantially axially and rigidly attached thereto by a suitable means (not shown) such as a packing gland. A tube 18 is disposed concentrically within tube 17 and extends into the cylindrical chamber 13, preferably beyond the extremity of the tube 17. A vertically disposed apertured disc or circular plate 19 serves as a closure member for the annular spacing formed by the tubes 17 and 18 at the extremity of said spacing disposed within chamber 13 and is rigidly attached to said tubes by welding. The purpose of disc 19 is to prevent blowout of the flame under operating conditions. The disc 19 has a diameter substantially greater than the outside diameter of the tube 17 but substantially less than the diameter of the upstream opening of the refractory lined elongate tube 11.

Concentrically mounted by means of spacers (not shown) within tube 18 is a liquid hydrocarbon supply pipe 20 which terminates at a point approximately flush with the corresponding extremity of tube 18. Immediately behind disc 19 are provided a plurality of radially oriented apertures 22 through tube 17 communicating with the annular space formed by the said tube and tube 18. The end of pipe 20 disposed within the furnace can be equipped with a spray nozzle or left open if a vaporizable type of feedstock is employed. The other (and externally projecting) extremity of tube 17 is provided with an annular closure member 21. Combustion gas is supplied to the apertures 22 through the gas inlet connection 23. Rearwardly of the annular closure member 21 is provided an air connection 24 through which air is introduced into the annular air chamber formed by the inner surface of tube 18 and outer surface of the oil supply pipe 20; said annular chamber being provided with external closure member 25. The axial air flowing about the oil supply pipe 20 forms a concentrated stream about the feed stock emanating from supply pipe 20 and thereby aids in directing the injected feed stock down the center of inner tube 11. Additionally, where a spray nozzle is employed, said axial air prevents coke from forming on the nozzle tip to the degree whereby its spraying capacity is impaired.

The carbon producing feed stock can be injected into the embodiment shown in FIG. 1 anywhere within the cylindrical chamber 13 or for that matter within the initial or upstream portion of inner tube 11. A preferred position of the feedstock spray nozzle is about at the entrance of upstream extremity of inner tube 11.

Communicating with the downstream end of the refractory lined inner tube 11 is a quench section of which a fragmentary section is shown at 26 in FIG. 1. The quench section can suitably take the form of a cylindrical metallic tube having an outside diameter corresponding to that of the housing 10 and provided with a sufficient thickness of refractory or a combination of refractory and insulation layers so that the inner diameter thereof is essentially the same as that of the refractory lined inner tube 11 at the latter's downstream end. The quench tube can be connected to the outer shell 10 by means of a flange associated with the inner tube 11 as shown in the drawing, which flange also serves as a closure member for the downstream extremity of the annular spacing formed by housing 10 and the inner tube 11. The various connections to the flange can be accomplished by welding or bolting. The quench section 26 is provided with a radial spray port 27 through which there extends a water pipe 28, the latter terminating adjacent the center line of the quench section and being provided with a spray head 29 which is directed toward the upstream end of the furnace.

In operation of the furnace shown in FIG. 1, the combustion air enters tangentially into the annular spacing formed by shell 10 and inner tube 11 near the downstream extremity of these elements and is forced in a helical flow pattern toward the upstream extremity of said annular spacing. The pre-heated air enters into chamber 13 through the louvered apertures of the frusto-cone 36 and mixes with the fuel gas discharged by the above-described burner. This combustible mixture commences to burn within chamber 13 and the resultant flame progresses into inner tube 11. The injected feedstock is almost immediately cracked into carbon black upon exposure to the flame.

The aerosol then flows toward the downstream end of the furnace where it is shock-cooled by the water spray so as to halt further reaction and to lower the temperature of the effluent so that same can be handled in a carbon black recovery system.

Figure 2:
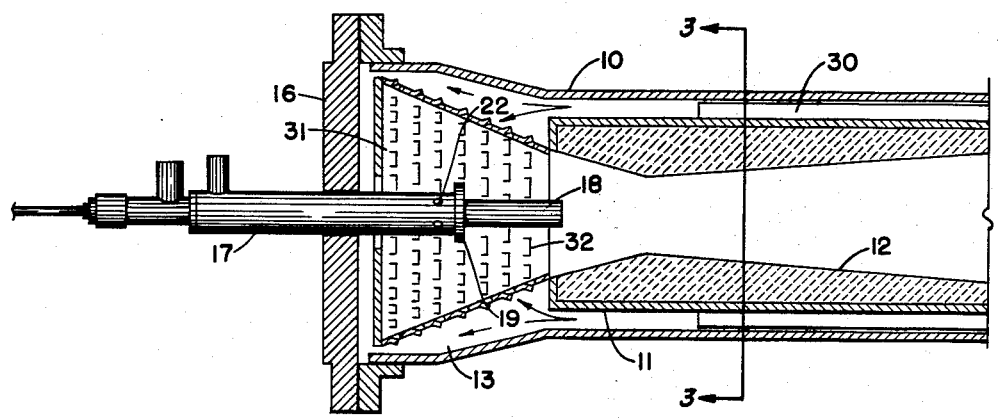
FIGURE 2 is a fragmentary longitudinal elevation, illustrating an embodiment of this invention.
Figure 3:
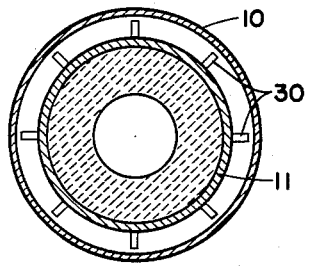
FIGURE 3 is a sectional view taken on the line 3—3 of FIG. 1.

FIGURE 2 illustrates a modification of the furnace generally depicted in FIG. 1 and one primarily adapted for producing carbon black by the longitudinal flame process. An additional difference between the furnace depicted in FIG. 1 and that of FIG. 2 resides in the design of the reaction zone, the latter featuring a Venturi section the throat of which is disposed within tubular member 11 near the upstream extremity thereof. The Venturi section can be shaped from the refractory employed to line tube 11 and as explained in application Serial No. 234,032 in or during the over-all heat transfer capability of the reactor tube combination is not substantially lessened. Employing a reactor tube having a length in the order of that specifically indicated above in connection with the apparatus depicted in FIG. 1, the throat of the Venturi can be spaced about six inches to three feet, and even somewhat more, from the upstream opening of said tube. The cross-sectional area of the throat can range from about 20 percent to 90 percent, and more preferably, from 30 percent to 50 percent of that of the nominal cross-sectional area of the reactor tube, for example, the circular cross-sectional area of the lined downstream opening thereof. Suitable convergent and divergent angles for the Venturi configuration (measured with respect to the longitudinal axis of the reactor tube) are from about 7° to 15° and 4° or less, respectively. In this embodiment the longitudinal flame pattern is achieved by effecting axial flow for the air passing through the annular preheat spacing formed by the outer surface of the reactor tube 11 and the encasing portion of the housing 10. The combustion air is introduced into said annular spacing at the downstream extremity thereof as described in connection with FIG. 1 and forced under pressure toward the upstream portion of the furnace, i.e., the generally cylindrical chamber 13. In order to assure an axial flow pattern for the combustion air, there is provided a plurality of vanes 30 about the outer surface of the reactor tube 11, said vanes suitably being rectangular strips having a width slightly less than that of the cross-sectional width of the annular spacing so as to allow for the expansion that will be experienced under operating conditions. The air guiding vanes can be of a length ranging from about 2 to 4 feet in length and are attached perpendicularly to the outer surface of the reactor tube or similarly mounted on a thin sleeve whose diameter will snugly accommodate the reactor tube. When employed in this manner, the air guiding vanes serve additionally as a support, thus maintaining the upstream end of the reactor tube 11 concentrically disposed within the housing 10. A plurality of guiding vanes are desirably used and as shown in FIG. 3, eight of such vanes equi-spaced can be advantageously employed. The air guiding vanes are located near the upstream end of the annular spacing. The upstream edges of the vanes can be located near the corresponding extremity of the annular spacing or can be spaced downstream therefrom as shown in FIG. 2.

Disposed within cylindrical chamber 13 is combustion aid device 31 having the same general shape and relative size as described for the similar element shown in FIG. 1. However, in this embodiment the louver elements are arranged in concentric rings at right angles to the longitudinal direction of the movement of the air. Preferably, as in FIG. 1, the louvered apertures become progressively larger in the direction of the upstream extremity of the frusto-cone combustion aid device 31 is also provided with an apertured enclosure member as previously described in connection with FIG. 1.

The operation of the apparatus depicted in FIG. 2 essentially corresponds to that described in connection with FIG. 1 except that there has been provided in the former modification the air guiding provision which assures that the flame pattern established within the reactor tube progresses downstream in a substantially longitudinal fashion. This embodiment also contemplates the use of a fuel burner arrangement identical with that shown in FIG. 1. In this arrangement, however, it is especially desirable to inject the feedstock upstream from the Venturi throat, e.g., at the upstream opening of reactor tube 11, so that substantially all dissociation of the feedstock occurs in or at the vicinity of Venturi throat.

Figure 4:
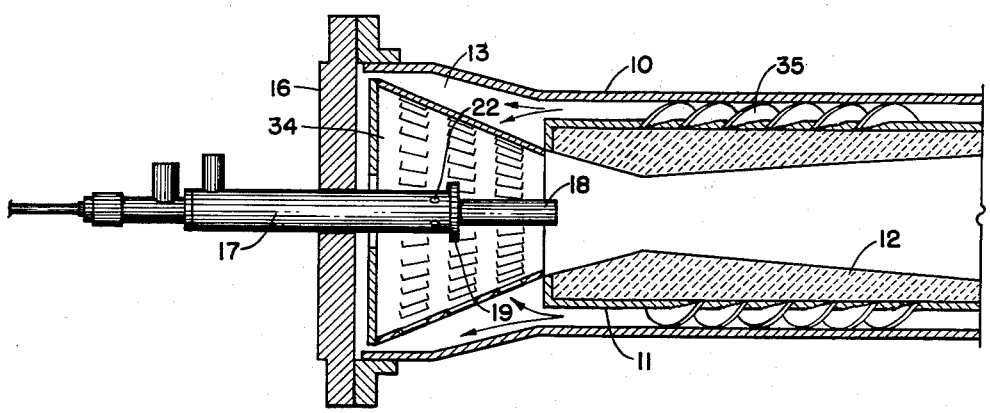
FIGURE 4 is a fragmentary longitudinal elevation, partly in section, illustrating a still further embodiment of the present invention.

FIGURE 4 illustrates an apparatus adapted for producing carbon black by means of the centrifugal flame process. With the exception of the combustion aid device generally depicted therein at 34 and the air guiding means, that is, the section of the air turning vanes shown at 35, the combination of the other elements is identical with those similarly numbered in FIG. 2 and consequently, the design and function of these like elements will not be repeated other than to mention that combustion aid device 34 is identical in design to that described in connection with FIG. 1.

The guiding means shown at 35 comprises a plurality of parallelly-spaced helicoid strips, each having a width corresponding to about that of the cross-sectional width of the annular spacing formed between outer shell 10 and the elongate reactor tube 11 and disposed perpendicularly about the peripheral surface of the latter. Advantageously, this section of air turning vanes is mounted as indicated at a location somewhat removed longitudinally from the upstream end opening of the reactor tube 11. In this manner, any tendency for the air to enter chamber 13 or impinge upon the combustion aid device 34 in a channelling fashion is substantially obviated. Any number of vanes can be used and the pitch thereof can also be varied in order to obtain the degree of spiraling or swirling action desired. The vanes can be affixed in a number of suitable ways such as, for example, welding to the inner tube 11, mounting on a circular band which in turn is slipped over the reactor tube, etc.

When employing a section of air turning vanes such as shown in FIG. 4, it is particularly preferred that the combustion be initially introduced into the annular passageway tangentially. It is also incidentally mentioned that the combustion air can, if desired, be introduced tangentially in the embodiment illustrated in FIG. 2 since the use of the particular type of air guiding means illustrated therein will satisfactorily change the flow pattern of such introduced air from a helical to a longitudinal movement.

In the operation of the embodiment shown in FIG. 4, the preheated combustion air flowing within the annular spacing formed by the outer shell 10 and the inner reactor tube 11 leaves the section of air turning vanes 35 in a helical fashion and the predominant portion thereof discharges into cylindrical chamber 13 in an inwardly spiraling manner. Therein the combustion air turbulently mixes with the fuel jetted from the radially disposed burner apertures and the resultant combustible mixture proceeds to progress helically through the refractory-lined reactor tube 11. The turbulent mixture of fuel gas and air commences to burn within chamber 13; however, because of the spaced relationship of the Venturi with respect to that of the cylindrical chamber 13, maximum temperatures are not developed until about the throat section of the Venturi. As mentioned previously, the feed stock is injected upstream with respect to where maximum temperature and highest turbulency are attained. Because almost sonic velocities are involved, feed stock, whether in vaporous or submicron divided form, remains for the most part undissociated until it reaches the Venturi throat where it is then instantaneously and essentially completely dissociated.

While there has been shown and described certain illustrative embodiments of this invention hereinbefore, it is to be understood that the invention is not to be limited thereto, since various other modifications can be made by those skilled in the art without departing from the spirit thereof.

What is claimed is:

1. An apparatus for producing carbon black which comprises:
   (a) an elongate tubular metallic housing having an upstream end and a downstream end, and a cover member closing said upstream end;
   (b) an elongate tubular, metallic reactor of lesser diameter than said housing supported substantially concentrically therein thereby providing an annular spacing therebetween, said reactor having substantially unrestricted upstream and downstream end openings and an essentially smooth metallic peripheral surface free from obstructions, said reactor upstream end opening disposed in longitudinal spaced relationship from said covered upstream housing end thereby providing an unobstructed cylindrical chamber therebetween having a length substantially less than that of said reactor;
   (c) heat conducting refractory means lining said reactor, said refractory means being of minimum thickness to protect the reactor and to provide maximum heat transfer through said reactor to said annular spacing;
   (d) tangential air input means disposed towards the downstream end of said housing and communicating with said annular spacing, said tangential input means adapted to impel air helically through said annular spacing in the general direction of said chamber;
   (e) a gas burner substantially concentrically disposed within said chamber;
   (f) a hydrocarbon inlet means positioned in substantially axial alignment with said burner whereby the hydrocarbon is introduced into the vortex of a flame produced by said burner; and
   (g) a flared hollow metallic member axially disposed within said cylindrical chamber with the smaller end thereof in open communication with the upstream opening of said reactor tube and divergently extending therefrom to provide a larger end having a periphery terminating inwardly of and in proximity to the corresponding peripheral extremity of the cylindrical chamber, said larger end having a centrally apertured integral closure means, said flared member further having a series of louvered apertures arranged so as to receive and direct predominantly all of the air flowing from said annular spacing toward the interior thereof.

2. An apparatus for producing carbon black which comprises:
   (a) an elongate tubular metallic housing having a downstream end and an upstream end, the latter being provided with a closure member;
   (b) an open elongate tubular metallic reactor of lesser diameter and length than said housing supported substantially concentrically therein with the corresponding downstream ends of the reactor and housing arranged in substantial flush alignment thereby providing an annular spacing about the reactor tube for the length thereof and a generally cylindrical chamber having a length substantially less than that of the reactor between the corresponding upstream ends of the reactor and housing;
   (c) a heat-conducting refractory means lining the reactor, said means shaped to provide a Venturi configuration at the upstream end of the reactor whose overall length of convergent and divergent sections is substantially less than that of the reactor;
   (d) tangential air input means disposed toward the downstream end of said housing and adapted to force air through said annular spacing into said chamber;
   (e) a fuel burner substantially concentrically disposed within said chamber;
   (f) a carbon black producing feedstock injection means positioned in substantial axial alignment with said burner and adapted to introduce the feedstock into the flame produced by said burner; and
   (g) a flared hollow metallic member axially disposed within said cylindrical chamber with the smaller end thereof in open communication with the upstream opening of said reactor tube and divergently extending therefrom to provide a larger end having a periphery terminating inwardly of and in proximity to the corresponding peripheral extremity of the cylindrical chamber, said larger end having a centrally apertured integral closure means, said flared member further having a series of louvered apertures arranged so as to receive and direct predominantly all of the air flowing from said annular spacing toward the interior thereof.

3. An apparatus in accordance with claim 2 having an air guiding means positioned within said annular spacing, said air guiding means adapted to impart a generally inwardly spiraling motion to the air flowing from said annular spacing.

4. An apparatus in accordance with claim 3 wherein said air guiding means comprises a plurality of parallelly-spaced helicoid strips each having a width corresponding to about that of the cross-sectional width of said annular spacing disposed perpendicularly about the peripheral surface of said reactor.

5. An apparatus in accordance with claim 2 having an air guiding means positioned within said annular spacing, said air guiding means adapted to effect axial flow of the air passing from said annular spacing and impinging upon said flared extension.

6. An apparatus in accordance with claim 5 wherein said air guiding means comprises a section of a plurality of parallelly-spaced rectangular strips each having a width corresponding to about that of the cross-sectional width of said annular spacing disposed perpendicularly about the peripheral surface of the reactor tube.

References Cited by the Examiner

UNITED STATES PATENTS

| | | | |
|---|---|---|---|
| 2,976,128 | 3/1961 | Latham et al. | 23—259.5 |
| 3,087,796 | 4/1963 | Latham et al. | 23—259.5 |

FOREIGN PATENTS 569,418   1/1959   Canada.

MORRIS O. WOLK, *Primary Examiner.*

JAMES H. TAYMAN, JR., *Examiner.*